United States Patent
Moidl et al.

(10) Patent No.: US 10,433,562 B2
(45) Date of Patent: Oct. 8, 2019

(54) METHOD OF REDUCING VOIDS IN DOUGH

(75) Inventors: Joseph B. Moidl, Ostego, MN (US); Frank Konkle, Elko, MN (US); David A. Gale, Plymouth, MN (US); Vince S. Pestritto, Sicklerville, NJ (US)

(73) Assignee: General Mills, Inc., Minneapolis, MN (US)

( * ) Notice: Subject to any disclaimer, the term of this patent is extended or adjusted under 35 U.S.C. 154(b) by 662 days.

(21) Appl. No.: 13/075,335

(22) Filed: Mar. 30, 2011

(65) Prior Publication Data

US 2011/0177197 A1      Jul. 21, 2011

Related U.S. Application Data

(62) Division of application No. 11/343,348, filed on Jan. 31, 2006.

(51) Int. Cl.
    *A21D 2/18*    (2006.01)
    *A21D 8/02*    (2006.01)

(52) U.S. Cl.
    CPC .......... *A21D 2/188* (2013.01); *A21D 8/02* (2013.01)

(58) Field of Classification Search
    CPC . A21D 8/02; A21D 2/188; A21D 8/04; A21D 13/02; A21D 2/36; A21D 2/00; A21D 8/047; A21D 8/00; A21D 13/00; A21D 2/08; A21D 2/12; A21D 2/18; C12N 1/00; C12N 1/04; C12N 1/14; C12N 1/16
    USPC ............ 426/19, 62, 549, 7, 18, 61, 531
    See application file for complete search history.

(56) References Cited

U.S. PATENT DOCUMENTS

| | | | |
|---|---|---|---|
| 4,237,170 A * | 12/1980 | Satin | 426/21 |
| 4,674,402 A | 6/1987 | Raufeisen | |
| 4,743,452 A | 5/1988 | Felske et al. | |
| 4,824,683 A * | 4/1989 | Hodgson et al. | 426/62 |
| 4,961,937 A | 10/1990 | Rudel | |
| 4,986,992 A | 1/1991 | Glaros et al. | |
| 4,996,062 A | 2/1991 | Lehtonen et al. | |
| 5,164,216 A | 11/1992 | Engelbrecht et al. | |
| 5,260,082 A | 11/1993 | delValle et al. | |
| 5,439,696 A | 8/1995 | Rabe et al. | |
| 5,451,417 A | 9/1995 | Freyn et al. | |
| 5,547,690 A | 8/1996 | Vaisanen et al. | |
| 5,672,369 A | 9/1997 | Lonergan et al. | |
| 5,804,233 A | 9/1998 | Lonergan et al. | |
| 6,042,852 A | 3/2000 | Atwell et al. | |
| 6,261,613 B1 | 7/2001 | Narayanaswamy et al. | |
| 6,358,543 B1 | 3/2002 | Soe et al. | |

(Continued)

FOREIGN PATENT DOCUMENTS

| | | |
|---|---|---|
| EP | 0 305 071 | 3/1989 |
| EP | 0 469 564 | 2/1992 |

(Continued)

OTHER PUBLICATIONS

Fruit vs vegetable definition downloaded from the internet at www.diff.com/difference/fruit_vs_vegetable on Oct. 7, 2013.*

(Continued)

*Primary Examiner* — D. Lawrence Tarazano
*Assistant Examiner* — Stephanie A Cox
(74) *Attorney, Agent, or Firm* — Diederiks & Whitelaw, PLC; John L. Crimmins, Esq.

(57) ABSTRACT

Methods of making dough pieces that can be baked to form baked bread articles having a reduced number of voids in the crumb are provided.

19 Claims, 4 Drawing Sheets

(56) References Cited

U.S. PATENT DOCUMENTS

| | | | |
|---|---|---|---|
| 6,383,530 | B1 | 5/2002 | Iwashita et al. |
| 6,391,350 | B1 | 5/2002 | Iwashita et al. |
| 6,579,554 | B2 | 6/2003 | Moder et al. |
| 6,589,583 | B1 | 7/2003 | Hansen et al. |
| 6,660,311 | B2 | 12/2003 | Goedeken et al. |
| 6,902,754 | B1* | 6/2005 | Evans et al. ............ 426/503 |
| 2003/0049358 | A1 | 3/2003 | Domingues |
| 2003/0049359 | A1 | 3/2003 | Kulkarni et al. |
| 2004/0241283 | A1 | 12/2004 | Domingues et al. |
| 2005/0074534 | A1 | 4/2005 | Goedeken et al. |
| 2005/0202126 | A1* | 9/2005 | Zhang et al. ............ 426/100 |
| 2005/0220961 | A1 | 10/2005 | Cox et al. |
| 2006/0073239 | A1* | 4/2006 | Boyle ............ A21D 2/181 426/89 |
| 2006/0073240 | A1 | 4/2006 | Mingus et al. |
| 2006/0078650 | A1 | 4/2006 | Bechtold et al. |
| 2007/0014891 | A1 | 1/2007 | Gale et al. |
| 2007/0178208 | A1 | 8/2007 | Moidl et al. |

FOREIGN PATENT DOCUMENTS

| | | |
|---|---|---|
| EP | 0 469 654 | 9/1993 |
| EP | 0 588 496 | 3/1994 |
| JP | 09-135656 | 5/1997 |
| WO | WO 03/022060 | 3/2003 |

OTHER PUBLICATIONS

Zhang, D., et al., Effect of wheat bran particle size on dough rheological properties. J. Sci. Food Agric. 74 (1997) 490-496.*
Shaping Dinner Rolls, 2009. downloaded from the internet at http://www.finecooking.com/articles/shaping-dinner-rolls.aspx.*
Semolina sesame seed twist, p. 124-125, Beth Hensperger, The Bread Bible, 1999, Raincoat Books, Vancouver, BC.*
Callaway, Joan. Challah I Recipe, All Recipes, 2002. [Retrieved on Oct. 25, 2018] Retrieved fron the Internet: URL <https://www.allrecipes.com/recipe/6760/challah-i/>. (Year: 2002).*
U.S. Northern Grown Durum Wheat, 2005. [Retrieved on Oct. 25, 2018] Retrieved from the Internet: URL <https://www.uswheat.org/wp-content/uploads/reports/crop_quality_reports/2005%20Durum.pdf>. (Year: 2005).*
Semolina and Ale Bread. Whats Cooking America. Dec. 17, 2002. [Retrieved on Nov. 20, 2018] Retrieved from the Internet: URL <https://web.archive.org/web/20021217095412/https://whatscookingamerica.net/Bread/SemolinaBread.htm>. (Year: 2002).*
Harold McGee, "On Food and Cooking, The Science and Lore of the Kitchen", *Simon & Schuster*, New York, New York, 1997, p. 300-303.
*Novzvmes*, 2000.
Zhang, D., et al. "Effect of Wheat Bran Particle Size on Dough Rheological Properties", *J. Sci. Food Agric.*, 74 (1007) 490-496.
Beth Hensperger, "Semolina Sesame Seed Twist", *The Bread Bible*, 1999, Raincoat Books, Vancouver, BC, p. 124-125.

* cited by examiner

METHOD OF REDUCING VOIDS IN DOUGH

PRIORITY CLAIM

The present non-provisional patent application is a divisional of prior patent application Ser. No. 11/343,348, filed Jan. 31, 2006, and entitled METHOD OF REDUCING VOIDS IN DOUGH, wherein the entirety of patent application Ser. No. 11/343,348 is incorporated herein by reference.

BACKGROUND

A number of manufacturing methods have been employed in order to make various types of bread articles, such as loaves, buns, rolls, biscuits, and breadsticks, from a sheet of dough. In such high volume manufacturing systems, a sheet of bread dough may typically be extruded, reduced, and provided to a conveyor that conveys the sheet of dough along a dough travel path. The sheet of dough then encounters one or more cutting apparatus, such as slitter wheels, guillotine-type cutters, reciprocating head cutters, or rotatable drum-type cutters. Such cutters, traditionally, have employed very thin or sharp cutting edges in order to cut the dough. For instance, many such cutting edges are only approximately 1/32 of an inch thick.

However, such cuts can render aesthetically unpleasing dough pieces. For example, rather than resulting in a bun that has rounded corners and which resembles a hand-made bun, the cut bun has sharp and squared off edges which can be aesthetically undesirable. U.S. Pat. No. 6,902,754 reports a blunt edge dough cutting or dough-engaging surface that is configured to pull a first surface of the dough toward a second surface of the dough, when the cutter is impinged on the dough sheet. This device tends to pinch the two surfaces of dough together, and also, when desired, severs the dough sheet. This results in a dough product that more closely resembles a hand formed dough product, with rounded edges, rather than straight or sharply angled edges. The blunt edge dough cutting or engaging surface can achieve a high throughput while still maintaining its advantages.

In some instances, dough pieces that are formed from sheeted dough using a dough cutter may result in baked articles having an undesirable number of voids in the crumb of the baked article. This problem is particularly prevalent in small baked articles (e.g., small dinner rolls) that are prepared from white dough compositions (i.e., dough composition comprising mainly refined flour) using a blunt edge cutter. Voids in the crumb of the baked bread article are aesthetically undesirable to the consumer of the baked bread article. In view of the foregoing, a method of reducing voids in the crumb of baked articles that are prepared from white dough compositions using a blunt edge dough cutter is desirable.

BRIEF DESCRIPTION OF THE DRAWINGS

The invention will be described further in connection with the attached drawings, wherein like reference numbers have been used to indicated like parts and wherein.

SUMMARY

Figure 1:
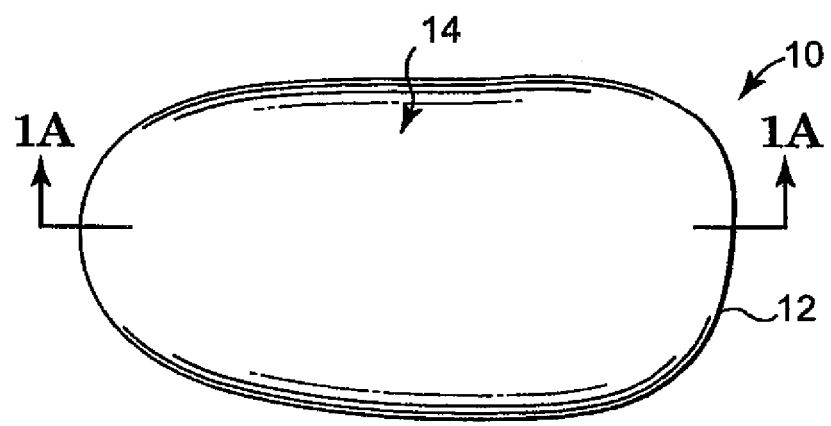
FIG. 1 illustrates a perspective view of an embodiment of a baked bread article in the form of a dinner roll.

In one aspect, the invention provides a method of making a dough piece that can be baked to form a baked bread article having a reduced number of voids in the crumb. In one embodiment, the method of making a dough piece comprises the steps of:

(a) providing a sheet of a developed dough composition having a first surface and a second surface, the developed dough composition comprising:
  (i) a flour component comprising white or refined flour,
  (ii) a liquid component,
  (iii) a leavening agent, and
  (iv) a void-reducing amount of a fiber or bran;
(b) providing a dough cutting apparatus having a movable cutter with a dough-engaging portion that extends sufficiently to sever the dough sheet,
(c) severing the dough sheet with the dough-engaging portion to form a dough piece; and
(d) causing the moveable cutter to release the dough piece.

In another embodiment, the method of making a dough piece comprises the steps of:

(a) providing a sheet of a developed dough composition having a first surface and a second surface, the developed dough composition comprising:
  (i) a flour component comprising white or refined flour,
  (ii) a liquid component,
  (iii) a leavening agent, and
  (iv) a void-reducing amount of a fiber or bran;
(b) providing a dough cutting apparatus having a movable cutter with a dough-engaging portion that extends sufficiently to sever the dough sheet, the dough-engaging portion having a dough shaping surface to shape and sever the dough sheet;
(c) causing the dough shaping surface of the dough-engaging portion to contact the first surface of the dough sheet and thereby drawing the first surface toward the second surface and substantially pinching the first and second surfaces together;
(d) severing the dough sheet with the dough-engaging portion after the first surface and the second surface become substantially pinched together to form a dough piece; and
(e) causing the moveable cutter to release the dough piece.

Advantageously, the dough pieces formed by the method of the invention can be baked to form baked bread articles having a reduced number of voids in the crumb.

As used herein, a "void" refers to an open area or gap in the crumb portion of a baked bread article that has at least one dimension of about 0.5 inch or greater. Voids may be observed by cutting the baked bread article in order to reveal a cross-sectional surface of the crumb. Although useful in a variety of sheeted dough methods, dough compositions comprising a void reducing amount of a fiber or bran are particularly useful when the dough pieces are to be formed using a blunt edge dough cutter, for example, of the type reported in U.S. Pat. No. 6,902,754. Such blunt edge dough cutters have been observed to form dough pieces that are particularly susceptible to the formation of voids when baked.

Dough pieces of the invention are prepared from dough compositions that comprise a "void-reducing amount" of a fiber or bran. It has been observed that by adding a void-reducing amount of a fiber or bran to a dough composition otherwise formulated to produce a white bread, the number of voids in the crumb of the resulting baked bread article can be reduced as compared to a dough composition formulated without the void-reducing amount of the fiber or bran. For example, in some embodiments, the total number of voids in the crumb is reduced by about 20% or more as compared to a dough composition formulated without the void-reducing amount of fiber or bran. In other embodiments, the total number of voids is reduced by about 25% or more as compared to a dough composition formulated without the void-reducing amount of fiber or bran. In other embodiments, the total number of voids is reduced by about 50% or more as compared to a dough composition formulated without the void-reducing amount of fiber or bran. In yet other embodiments, the total number of voids is reduced about 75% or more, or even about 90% or more as compared to a dough composition formulated without the void-reducing amount of fiber or bran.

DETAILED DESCRIPTION

The embodiments of the invention described herein are not intended to be exhaustive or to limit the invention to the precise forms disclosed in the following detailed description. Rather, the embodiments are chosen and described so that others skilled in the art can appreciate and understand the principles and practices of the invention.

Figure 1A:
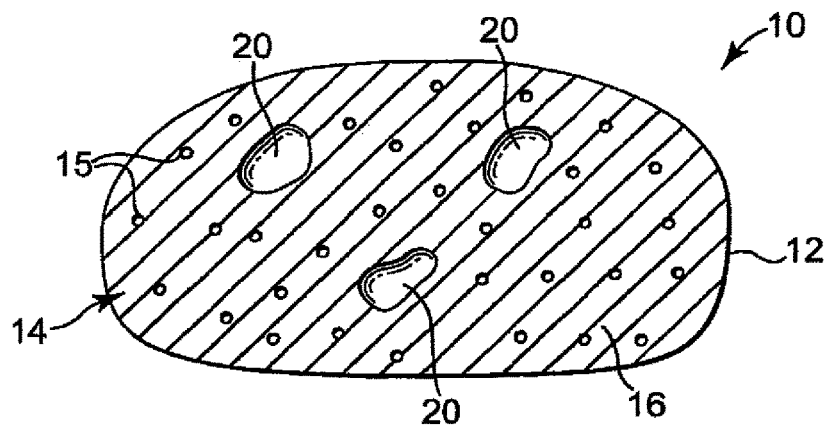
FIG. 1A illustrates a cross-sectional view of the dinner roll of FIG. 1 taken along line 1A-1A.

Referring now to FIG. 1 a representative baked bread article 10 in the form of a diner roll is shown. Baked bread article 10 includes outer crust 12 and inner crumb 14. Referring now to FIG. 1A, a cross sectional view of dinner roll 10 of FIG. 1 is shown taken along line 1A-1A. As can be seen in FIG. 1A, outer crust 12 surrounds crumb 14. Crumb 14 is made up of a cellular-like structure including a multiplicity of very small air pockets 15 distributed throughout a continuous portion 16 comprising gluten (not shown) and partly gelatinized starch granules (not shown). Baked bread article 10 includes voids 20 that are randomly distributed throughout crumb 14 of article 10. As shown in FIG. 1A, voids 20 are irregular in size and shape and are significantly larger is cross-sectional dimension than air pockets 15.

Figure 1B:
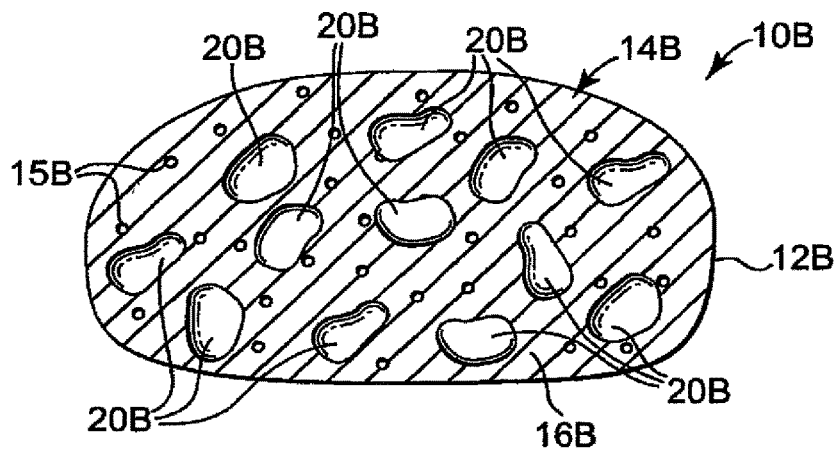
FIG. 1B illustrates a cross-sectional view of an embodiment of a baked bread article in the form of a dinner roll.
Figure 1C:
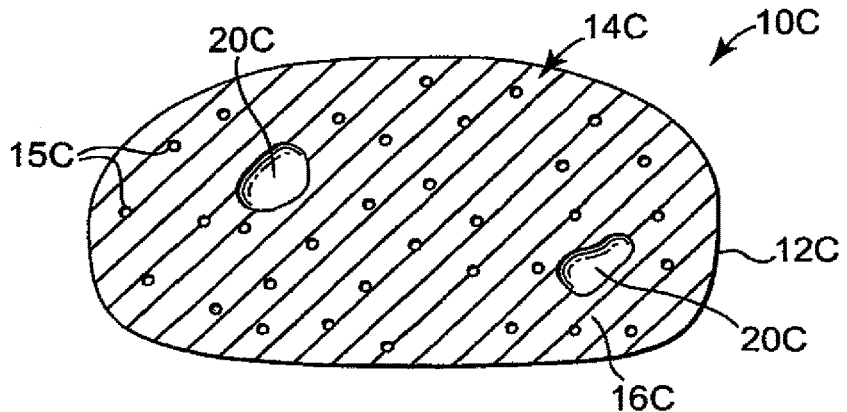
FIG. 1C illustrates a cross-sectional view of an embodiment of a baked bread article of the invention in the form of a dinner roll.

Referring now to FIG. 1B, a cross-sectional view of another baked bread article 10B is shown. Baked bread article 10B has a plurality of voids 20B of various shapes and sizes located in crumb 14B. FIG. 1B illustrates a baked bread article that has undesirable number of voids 20B in the crumb 14B and may be objectionable to a consumer. Referring now to FIG. 1C, a cross-sectional view of a baked bread article of the invention 10C is shown. Baked bread article 10C has a small number of voids 20C in crumb 14C. In accordance with the invention, crumb 14C comprises a void-reducing amount of a fiber or bran. FIG. 1C illustrates a baked bread article having an acceptable number of voids in the crumb and that would be considered to be acceptable to a consumer.

Useful dough compositions are developed doughs that comprise a flour component comprising white or refined wheat flour, a liquid component (e.g., water), a leavening agent (e.g., yeast and optionally one or more chemical leavening agents), and a void-reducing amount of a fiber or bran material. The dough compositions may also include other ingredients, for example, fat (e.g., oil or shortening), sweetener (e.g., sugar or high fructose corn syrup), emulsifier, dough conditioner, enzymes, dairy products, egg products, processing aids, flavorings, and other ingredients typical of white bread articles.

The flour component of the dough composition comprises white or refined wheat flour. White or refined wheat flour is typically prepared by grinding only the endosperm of a wheat kernel after it has been separated from the bran and the germ. By contrast, whole-wheat flour is prepared by grinding the endosperm along with the bran and germ. In some embodiments, the white or refined flour is bleached. In some embodiments, the flour component consists essentially of white or refined wheat flour. In other embodiments, the flour component consists of white or refined wheat flour. In some embodiments, the flour component comprises about 95% weight or greater white or refined wheat flour. In other embodiment, the flour component comprises 99% weight or greater white or refined wheat flour.

Representative examples of white or refined wheat flours include all-purpose flour (i.e., a blend of hard and soft wheat), bleached flour, bread flour (i.e., made up of hard wheat flour), bromated flour, and high-gluten flour. Useful white or refined wheat flours are commercially available, for example, from Archer Daniels Midland Co. In some embodiments, the dough composition comprises white or refined flour in an amount ranging from about 35% to about 75% weight based on the total weight of the dough composition.

Dough compositions useful in the invention comprise a void-reducing amount of a fiber or bran. As used herein "bran" refers to the fiber-rich husk on a grain or seed. Although not wishing to be bound by theory, it is believed that the fiber or bran provides interruptions in the gluten matrix that limit the ability of internal bubbles to coalesce and expand during baking. The fiber or bran is added to the dough composition in an amount that is effective to reduce the number of voids that form in the crumb when the dough composition is baked to form a baked bread article. For a given dough piece, the void-reducing amount of fiber or bran may depend upon several factors including, for example, the method of forming the dough piece, the type of fiber or bran used in the dough composition, the particle size of the fiber or bran used in the dough composition, and the type and amount of other ingredients making up the dough composition. In some embodiments, the fiber or bran is present in an amount of about 0.5% weight to about 25% weight of the total weight of the dough composition. In some embodiments, the fiber or bran has a mild flavor so that it does not alter or detract from the taste of the baked bread article. In some embodiments, the fiber or bran is light in color so that the baked bread article has an appearance that is very similar to white bread (i.e., bread made from only white or refined flour). In other embodiments, the fiber or bran is darker in color, but is used in the dough composition in a small enough amount so that the crumb of the baked bread article has the appearance of white bread.

Representative examples of useful fibers and brans include grain-based fibers (e.g., oat fiber), grain bran (e.g., oat bran, durum bran, and whole grain durum flour), cellulose-based fibers, vegetable-based fibers, fruit-based fibers, sugar beet fiber, bamboo fiber, and polydextrose. Combinations of the foregoing may also be useful. A useful source of oat bran is commercially available under the trade designation "OAT BRAN 140" oat bran (from Grain Millers, Inc.).

Cellulose-based fiber is commercially available under the trade designation "SOLKA-FLOC" powdered cellulose (from International Fiber). Fruit-based fiber is commercially available under the trade designation "LOW MOISTURE" apple fiber (from Treetop Fruit Ingredients). Sugar beet fiber is commercially available under the trade designation "FIBREX" sugar beet fiber (from International Fiber Corp.). Bamboo fiber is commercially available under the trade designation "JUSTFIBER" bamboo fiber (from International Fiber Corp.). Polydextrose is commercially available under the trade designation "LITESSE" polydextrose (from Danisco). Cottonseed fiber is commercially available under the trade designation "JUSTFIBER" cottonseed fiber (from International Fiber Corp.).

In some embodiments, the dough composition comprises a void-reducing amount of oat fiber. In some embodiments, the dough composition may comprise about 0.5% weight or greater oat fiber, for example, about 1% weight or greater or about 2% weight or greater oat fiber based on the total weight of the dough composition. In some embodiments, the dough composition may comprise about 10% by weight or less of oat fiber, for example, about 9% weight or less, about 8% weight or less, about 7% weight or less, about 6% weight or less, about 5% weight or less, about 4% weight or less, about 3% weight or less, about 2% weight or less, or about 1% weight or less oat fiber based on the total weight of the dough composition. In an exemplary embodiment, the dough composition comprises between about 1% to about 5% by weight oat fiber based on the total weight of the dough composition. Suitable oat fiber is commercially available under the trade designation "CANADIAN HARVEST" oat fiber (from Sun Opta Ingredients).

In some embodiments, the dough composition comprises a void-reducing amount of durum bran. Durum bran is typically derived from the bran portion of durum wheat, amber durum wheat, hard amber durum wheat, or red durum wheat. In some embodiments, the dough composition may comprise about 0.5% weight or greater durum bran, for example, about 1% weight or greater or about 2% weight or greater durum bran based on the total weight of the dough composition. In some embodiments, the dough composition may comprise about 10% weight or less durum bran, for example, about 9% weight or less, about 8% weight or less, about 7% weight or less, about 6% weight or less, about 5% weight or less, about 4% weight or less, about 3% weight or less, about 2% weight or less, or about 1% weight or less durum bran based on the total weight of the dough composition. In an exemplary embodiment, the dough composition comprises about 0.5% weight to about 6% weight durum bran based on the total weight of the dough composition.

In some embodiments, the durum bran is provided in the form of whole grain durum flour. Useful whole grain durum flour is described, for example, in U.S. patent application Ser. No. 11/212,860, filed Aug. 26, 2005, titled WHOLE GRAIN PRODUCTS MADE WITH WHOLE GRAIN DURUM WHEAT. In some embodiments, the dough composition may comprise about 0.5% weight or greater whole grain durum flour, for example, about 1% weight or greater or about 2% weight or greater whole grain durum flour based on the total weight of the dough composition. In some embodiments, the dough composition may comprise about 15% weight or less whole grain durum flour, for example, about 14% by weight or less, about 13% weight or less, about 12% weight or less, about 11% weight or less, about 10% weight or less, about 9% weight or less, about 8% weight or less, about 7% weight or less, about 6% weight or less, about 5% weight or less, about 4% weight or less, about 3% weight or less, about 2% weight or less, or about 1% weight or less whole grain durum flour based on the total weight of the dough composition. In an exemplary embodiment, the dough composition comprises about 1% to about 15% weight whole grain durum flour based on the total weight of the dough composition. In another exemplary embodiment, the dough composition comprises about 2% to about 10% weight whole grain durum flour based on the total weight of the dough composition.

Examples of liquid components in the dough composition include water, milk, eggs, and oil, or any combination of these. Water may be added during processing in the form of ice, to control the dough temperature in-process; the amount of any such water used is included in the amount of liquid components. The amount of liquid components included in the dough composition can depend on a variety of factors including the desired moisture content and rheological properties of the dough composition. In some embodiments, water is included in an amount ranging from about 15% weight to about 50% weight based on the total weight of the dough composition.

The dough compositions may optionally include egg or dairy products such as milk, buttermilk, or other milk products, in either dried or liquid forms. Non-fat milk solids which can be used in the dough composition can include the solids of skim milk and may include proteins, mineral matter, and milk sugar. Other proteins such as casein, sodium caseinate, calcium caseinate, modified casein, sweet dairy whey, modified whey, and whey protein concentrate can also be used in these doughs.

The dough composition may optionally include fat ingredients such as oils (liquid fat) and shortenings (solid fat). Examples of suitable oils include soybean oil, corn oil, canola oil, sunflower oil, and other vegetable oils. Examples of suitable shortenings include animal fats and hydrogenated vegetable oils. If included, fat is typically used in an amount less than about 10 percent by weight, often less than 5 percent by weight of the total dough composition. For example, certain embodiments include soybean oil in an amount from about 1 to 2 weight percent.

The dough composition may optionally include one or more sweeteners, either natural or artificial, liquid or dry. Examples of suitable dry sweeteners include lactose, sucrose, fructose, dextrose, maltose, corresponding sugar alcohols, and mixtures thereof. Examples of suitable liquid sweeteners include high fructose corn syrup, malt, and hydrolyzed corn syrup.

The dough composition may include additional flavorings, for example, salt, (e.g., sodium chloride and/or potassium chloride), whey, malt, yeast extract, yeast (e.g., inactivated yeast), spices, vanilla, and the like as known in the dough making arts. Certain embodiments include salt in an amount less than about 2% weight, for example, in the range from about 0.5% to 1.5% weight.

The dough composition may optionally include other additives, colorings, and processing aids such as emulsifiers, strengtheners (e.g., ascorbic acid), enzymes, preservatives, and conditioners. Suitable emulsifiers include lecithin, mono- and diglycerides, polyglycerol esters, and the like, e.g., diacetylated tartaric esters of monoglyceride (DATEM) and sodium stearoyl-2-lactylate (SSL). Acidulants commonly added to foods include lactic acid, citric acid, tartaric acid, malic acid, acetic acid, phosphoric acid, and hydrochloric acid. Enzymes may be included for anti-staling, dough strengthening, texturizing, shelf life extension and processing optimization. Examples of enzymes include amylases (e.g., alpha amylase), lipases, pentosanases, and xylanases. Enzymes may be obtained, for example, from Danisco (Copenhagen, Denmark).

Conditioners, as are known in the dough products art, can be used to make the dough composition tougher, drier, and/or easier to manipulate. Examples of suitable conditioners can include azodicarbonamide, potassium sulfate, potassium sorbate, L-cysteine, L-cysteine hydrochloride, sodium bisulfate, mono- and di-glycerides, polysorbates, sodium bisulfite, sodium steamyl lactylate, ascorbic acid and diacetyltartaric acid esters of mono- and di-glycerides (DATEM), and the like. These conditioners may add functionality, reduce mix times, and provide softness to the doughs to which they are added. In some embodiments, the dough composition includes L-cysteine in an amount up to about 90 ppm.

The dough compositions may be yeast leavened or chemically leavened. Yeast leavened refers to dough compositions that are leavened primarily due to the production of gaseous metabolited by yeast; chemical leavening agents may optionally be present, but in minor amounts, preferably less than about 10% by weight chemical leavening agent based on the total weight of the leavening agent (yeast and chemical leavening agent) or may not be present at all. Yeast is included to produce gaseous metabolites (e.g., carbon dioxide) that cause the dough composition to rise. The yeast may be any suitable yeast known to those of skill in the art, for example, fresh cream/liquid yeast, fresh compressed yeast, active dry yeast, and instant yeast. In some embodiments, the yeast is fresh compressed yeast (e.g., in cake or crumbled form) comprising about 65% to about 75% water and about 25% to about 35% yeast. The amount of yeast can be an amount that will produce a desired volume of gaseous metabolites, as known to one of skill in the art. Typically, the amount of yeast added to the dough composition ranges from about 0.25% to about 10% weight on a dry basis based on the total weight of dough composition.

In some embodiments a chemical leavening agent is used in addition to yeast. If present, a chemical leavening agent typically comprises acidulants and bases. Representative examples of acidulants include SALP, SAPP, GDL and MCP. Representative examples of bases include sodium bicarbonate, potassium bicarbonate, and ammonium bicarbonate. Often, chemical leavening agents are present in a minor amount relative to the total weight of the yeast.

Representative examples of baked dough articles include French bread, Italian bread, hoagie or submarine sandwich buns, dinner rolls, hamburger buns, hard rolls, Kaiser rolls, hot dog buns, bratwurst buns, or bolillos (Mexican tapered rolls). In some embodiments, the baked dough articles are prepared from dough pieces having a piece weight of about 1 to about 20 ounces (28.4 to 567 grams) before baking. In one embodiment, the dough article comprises a dinner roll having a piece weight of about 1 to about 1.25 ounces (28.4 to 35.4 grams) before baking. In another embodiment, the dough article comprises a hoagie or submarine sandwich bun having a piece weight of about 4 ounces to about 8 ounces (113.4 to 226.8 grams) before baking. In another embodiment, the dough article comprises a hot dog bun or bratwurst bun having a piece weight of about 1.5 ounces to about 3.0 ounces (42.5 to 85.0 grams) before baking.

Figure 2:
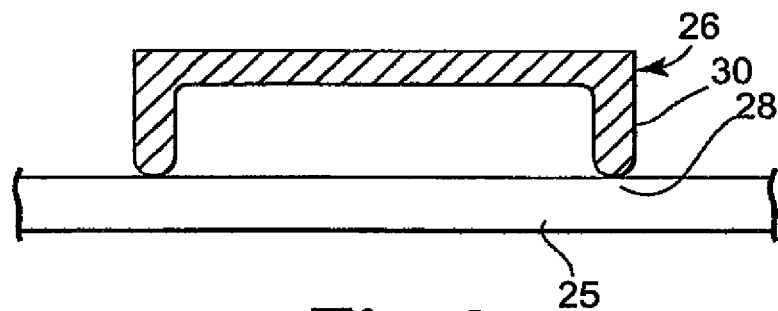
FIG. 2 illustrates a dinner roll cutter.
Figure 3:
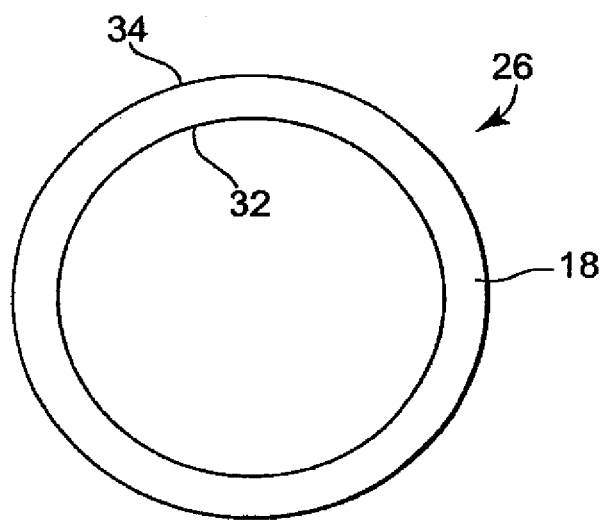
FIG. 3 is a bottom plan view of the dinner roll cutter shown in FIG. 2.

The dough composition may be prepared according to conventional techniques known in the dough making arts. In some embodiments, the dough composition is processed into dough pieces using the method described in U.S. Pat. No. 6,902,754 (Evans et al.). FIG. 2 illustrates a sheet of dough 25 and a cross section of a cutter 26. In the embodiment of FIG. 2, the cutter 26 is substantially round in shape, however, other shapes may also be used. Dough cutter 26 has cutting portion 28 that engages and cuts dough sheet 25. Cutting portion 28, in the embodiment illustrated in FIG. 2 is round or blunt. In some embodiments, blunt cutting portion 28 has a radius of curvature of about 0.125 to about 0.250 inch. Blunt portion 28 is formed about the bottom of annular ring 30, which defines the cutting depth of cutter 26. In some embodiments, the thickness of annular ring 30 is in the range of about 0.25 to 0.50 inch. FIG. 3 is a bottom plan view of cutter 26 illustrated in FIG. 2. FIG. 2 illustrates that, in the embodiment illustrated in FIGS. 2-3, cutter 26 has a substantially similarly shaped inner edge 32 and outer edge 34.

Figure 4:
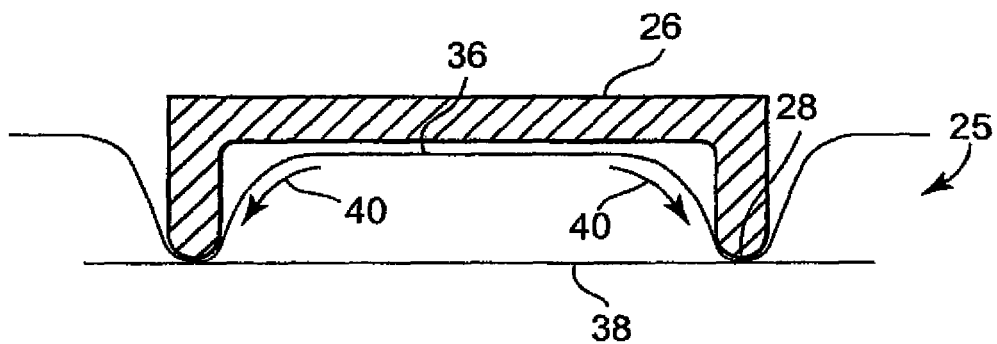
FIG. 4 illustrates a cutting operation using the dinner roll cutter shown in FIGS. 2 and 3.

FIG. 4 illustrates the use of dough cutter 26 in cutting dough sheet 25. Cutter 26 can be mounted to one of any number of different types of cutting mechanisms which either press cutter 26 onto dough sheet 25, or cause dough sheet 25 to be pressed into cutter 26. In either case, cutting portion 28 of cutter 26 engages a surface 36 of dough sheet 25. In the embodiment illustrated in FIG. 4, cutter 26 is pressed against upper surface 36 of dough sheet 25, toward lower surface 38 of dough sheet 25. As cutter 26 is depressed against the dough sheet, cutting portion 28 begins to make an impression in the upper surface 36 of dough sheet 25.

Figure 5:
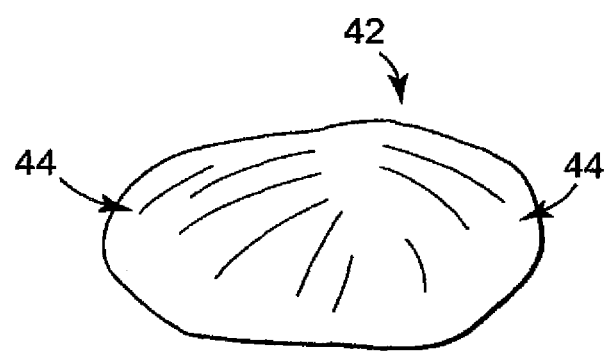
FIG. 5 illustrates a side view of a dough piece cut using the dinner roll cutter of FIG. 2.

Cutting portion 28 is wide enough such that frictional engagement between the upper surface 36 of dough sheet 25 and cutting portion 28 acts to draw, or pull, the top surface 36 of dough sheet 25 downwardly, as indicated by arrows 40, toward the bottom surface 38. The pressure exerted by cutting portion 28 also acts to pinch together top surface 36 of dough sheet 25 and bottom surface 38. This results in a more rounded dough piece 42 as shown in FIG. 5. Thus, rather than having straight and squared off edges, dough piece 42 has rounded edges 44, which are formed by upper surface 36 of dough sheet 25 being pulled toward the bottom surface 38 of dough sheet 25 when dough sheet 25 is severed by cutting portion 28 of cutter 26.

The dough pieces may optionally be frozen, for example at a temperature ranging from about −10° F. (−23° C.) to about 10° F. (−12° C.). Prior to baking a frozen piece, the dough piece can be thawed and proofed in a controlled manner (e.g., using a proofer, retarder, or by floor proofing) prior to baking. The dough pieces can be baked by conventional methods, such as by oven baking. Exemplary baking temperatures can be in the range of about 325° F. (163° C.) to about 400° F. (205° C.). The dough pieces can be baked in any type of oven, such as conventional, convection, or impingement.

The invention will now be further described with reference to the following non-limiting examples.

EXAMPLES

Examples 1-3 and Comparative Example A

Dough Preparation:

Dough compositions having the ingredients listed in TABLE 1 were prepared. First, all dry ingredients were added to the mixer. The liquid ingredients were then added to the mixer. The ingredients were mixed on low speed (36 rpm) for about 1 minute. Following this, the ingredients were mixed on high speed (72 rpm) for about 9 minutes. The resulting dough had a temperature of 68° F.±2° F. and a Farinograph of 850±50 BU.

TABLE 1

| Ingredient | Comp. Ex. (Weight %) | Example 1 (Weight %) | Example 2 (Weight %) | Example 3 (Weight %) |
|---|---|---|---|---|
| Flour | 57.12 | 53.06 | 47.21 | 41.77 |
| Whole Grain Durum Flour | 0 | 2.79 | 8.33 | 13.92 |
| Water | 29.70 | 29.60 | 29.99 | 29.80 |
| High Fructose Corn Syrup | 4.57 | 4.47 | 4.44 | 4.46 |
| Soybean Oil | 0.31 | 0.31 | 0.31 | 0.31 |
| Fresh Crumbled Yeast | 6.85 | 8.38 | 8.33 | 8.35 |
| Salt | 1.12 | 1.10 | 1.09 | 1.10 |
| Dough Conditioners/Enzymes | 0.31 | 0.30 | 0.30 | 0.30 |

The resulting dough compositions were sheeted on a RONDO brand sheeter and were then formed into dough pieces using a MOLINE brand line equipped with crimp disc cutters with 1.5 inch spacing. The target weight of the cut dough piece was 230 grams and the target length was 10 inches. The resulting dough pieces were then frozen. The dough pieces were placed in an oil-sprayed 5 channel perforated pan, which was placed in a retarder for 16 hours. Following the retarder, the dough pieces were allowed to sit covered at room temperature for 1 hour. Each dough piece was then scored lengthwise down the center of the dough piece. The dough pieces were then baked at 350° F. (with 30 second steam) using a Gemini brand rack oven for 20 to 25 minutes, or until brown.

After baking, each baked article was cut in half lengthwise along the score line. The voids in the crumb of the baked articles were measured and counted. The results are presented in TABLE 2.

TABLE 2

| Formula | Total Voids | Voids ½ to 1 inch | Voids greater than 1 inch | Number of Pieces | % Reduction in Voids |
|---|---|---|---|---|---|
| Comp. Ex. A | 15 | 10 | 5 | 8 | — |
| Example 1 | 6 | 5 | 1 | 8 | 60 |
| Example 2 | 3 | 2 | 1 | 8 | 80 |
| Example 3 | 4 | 2 | 2 | 8 | 73 |

Examples 4-6 and Comparative Example B

Dough compositions having the ingredients listed in TABLE 3 were prepared. First, all dry ingredients were added to the mixer. The liquid ingredients were then added to the mixer. The ingredients were mixed on low speed (36 rpm) for about 1 minute. Following this, the ingredients were mixed on high speed (72 rpm) for about 9 minutes. The resulting dough had a temperature of 68° F.±2° F. and a Farinograph of 850±50 BU.

TABLE 3

| Ingredient | Comp Ex. B (Weight %) | Example 4 (Weight %) | Example 5 (Weight %) | Example 6 (Weight %) |
|---|---|---|---|---|
| Flour | 57.12 | 53.06 | 47.21 | 41.77 |
| Whole Wheat Durum Flour | 0 | 2.79 | 8.33 | 13.92 |
| Water | 29.70 | 29.60 | 29.99 | 29.80 |
| High Fructose Corn Syrup | 4.57 | 4.47 | 4.44 | 4.46 |
| Soybean Oil | 0.31 | 0.31 | 0.31 | 0.31 |
| Fresh Crumbled Yeast | 6.85 | 8.38 | 8.33 | 8.35 |
| Salt | 1.13 | 1.10 | 1.09 | 1.10 |
| Dough Conditioners/Enzymes | 0.31 | 0.30 | 0.30 | 0.30 |

The resulting dough compositions were sheeted on a RONDO brand sheeter and were then formed into dough pieces using a MOLINE brand line equipped with crimp disc cutters with 2.5 inch spacing. The target weight of the cut dough piece was 545 grams and the target length of the dough piece was 13 inches. The resulting dough pieces were frozen. The dough pieces were placed in an oil-sprayed perforated 4 channel pan, which was placed in a retarder for 16 hours. Following the retarder, the dough pieces were stretched to a length of 22 inches. Each dough piece was then scored with five diagonal scores. The dough pieces were then baked at 385° F. (with 30 second steam) using a GEMINI brand rack oven for about 25 to 30 minutes.

After baking, each baked article was cut in half lengthwise. The voids in the crumb of the baked articles were measured and counted. The results are presented in TABLE 4.

TABLE 4

| Formula | Total Voids | Voids greater than 1 inch | Number of Pieces | % Reduction in Voids |
|---|---|---|---|---|
| Comp. Ex. B | 3 | 3 | 4 | — |
| Example 4 | 1 | 1 | 4 | 67 |
| Example 5 | 0 | 0 | 4 | 100 |
| Example 6 | 0 | 0 | 4 | 100 |

Examples 7-8 and Comparative Example C

Dough compositions having the formulations and ingredients shown in TABLE 5 were prepared. First, all dry ingredients were charged to a mixer. Then, all liquid ingredients were charged to the mixer. The resulting composition was mixed on low speed (36 rpm) for 1 minute, followed by mixing on high speed (72 rpm) for 9 minutes. The final temperature of the dough compositions was 68 F±2 F and the dough compositions had a Farinograph of 850±50 BU.

TABLE 5

| Ingredient | Comp. Ex. C (Weight %) | Example 7 (Weight %) | Example 8 (Weight %) |
|---|---|---|---|
| Flour | 55.68 | 55.07 | 53.03 |
| Water | 29.23 | 30.56 | 29.43 |
| High Fructose Corn Syrup | 4.45 | 4.41 | 4.24 |
| Soybean Oil | 0.31 | 0.30 | 0.29 |
| Yeast | 6.68 | 6.61 | 6.36 |
| Salt | 1.11 | 1.10 | 1.06 |
| Durum Bran | 0 | 1.65 | 5.30 |
| Dough Conditioners/Enzymes | 0.30 | 0.30 | 0.28 |

The resulting dough compositions where sheeted on a RONDO brand sheeter and were formed into dough pieces using a Moline line equipped with a crimp disc hoagie cutter having a 1.5 inch spacing. The target length of the dough pieces was 10 inches (25.4 cm) and the target weight was 230±15 grams. The resulting dough pieces were then frozen.

The frozen dough pieces were placed in an oil-sprayed 5 channel perforated pan which was placed in a retarder for 17 hours. Following the retarder, the dough pieces were allowed to sit covered at room temperature for 1 hour. Each dough piece was then scored lengthwise down the center of the dough piece. The dough pieces were then baked using a GEMINI brand rack oven at 350° F. (with 30 second steam) for 20 to 25 minutes, or until brown.

After baking, each baked article was cut in half lengthwise along the score line. The voids present in the crumb of the baked article was measured and counted. The results are presented in TABLE 6.

TABLE 6

| Formula | Total Voids | Voids less than ¾/inch | Voids greater than ¾ inch | Number of Pieces | % Reduction in Voids |
| --- | --- | --- | --- | --- | --- |
| Comp. Ex. C | 12 | 10 | 2 | 24 | — |
| Example 7 | 6 | 3 | 3 | 24 | 50 |
| Example 8 | 3 | 3 | 0 | 24 | 75 |

Examples 9-10 and Comparative Example D

Dough compositions having the formulations and ingredients shown in TABLE 7 were prepared. First, all dry ingredients were charged to a mixer. Then, all liquid ingredients were charged to the mixer. The resulting composition was mixed on low speed (36 rpm) for 1 minute, followed by mixing on high speed (72 rpm) for 9 minutes. The final temperature of the dough compositions was 68 F±2 F and the dough compositions had a Farinograph of 850±50 BU.

TABLE 7

| Ingredient | Comp. Ex. D (Weight %) | Example 9 (Weight %) | Example 10 (Weight %) |
| --- | --- | --- | --- |
| Flour | 56.14 | 53.82 | 52.84 |
| Water | 26.63 | 27.95 | 28.11 |
| High Fructose Corn Syrup | 8.12 | 8.12 | 8.12 |
| Yeast | 5.21 | 5.21 | 5.46 |
| Soybean Oil | 1.63 | 1.63 | 1.63 |
| Salt | 1.09 | 1.09 | 1.09 |
| Dough Conditioner/ Enzymes | 0.84 | 0.84 | 0.84 |
| Flavor | 0.07 | 0.07 | 0.14 |
| Baking Powder | 0.27 | 0.27 | 0.27 |
| Oat Fiber | 0 | 1.00 | 1.50 |

The resulting dough compositions where sheeted using a RONDO brand sheeter and were formed into dough pieces using a MOLINE brand line equipped with a 2" crimp hexagonal shaped cutter (see, FIG. 11A of U.S. Pat. No. 6,902,754). The target weight of the resulting dough piece was 35.4 grams. The resulting dough pieces were then frozen.

The frozen dough pieces were placed on a paper-lined sheet pan and were placed in a retarder for about 12-14 hours. Following the retarder, the dough pieces were allowed to sit covered at room temperature for about 1.5 to 2.5 hours. The dough pieces were then baked using a Bakers Aid brand rack oven at 350° F. (with 30 second steam) for 13 to 17 minutes.

After baking, each baked article was cut in half lengthwise. The voids present in the crumb of the baked article was measured and counted. The results are presented in TABLE 8.

TABLE 8

| Formula | Total Voids | Voids less than ¾ inch | Voids greater than ¾ inch | Number of Pieces | % Reduction in Voids |
| --- | --- | --- | --- | --- | --- |
| Comp. Ex. D | 36 | 22 | 14 | 48 | — |
| Example 9 | 29 | 20 | 9 | 48 | 19 |
| Example 10 | 12 | 10 | 2 | 48 | 67 |

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A method of making a dough piece that can be baked to provide a baked white bread article having a reduced total number of voids, the method comprising the steps of:
   (a) providing a sheet of a developed white bread dough composition having a first surface and a second surface, the developed dough composition comprising:
      (i) a flour component comprising white or refined flour,
      (ii) a liquid component,
      (iii) a leavening agent, and
      (iv) a void-reducing amount of a light-colored fiber or bran, the fiber or bran being oat fiber, oat bran, durum bran, whole grain durum flour, or a mixture thereof, wherein the fiber or bran is present in the dough composition in an amount ranging from about 0.5% to about 6% by weight;
   (b) providing a dough cutting apparatus having a movable cutter with a dough-engaging portion that extends sufficiently to sever the dough sheet,
   (c) severing the dough sheet with the dough-engaging portion to form a dough piece;
   (d) causing the moveable cutter to release the dough piece;
   (e) freezing the dough piece; and
   (f) thawing and proofing the dough piece in a retarder, wherein the leavening agent in the dough piece comprises yeast in an amount to proof the dough piece in the retarder, and wherein the yeast is present in an amount from 0.25% to 10% by weight on a dry basis.

2. The method of claim 1, wherein the dough-engaging portion of the movable cutter has a dough shaping surface to shape and sever the dough sheet; and wherein the method further includes the step of causing the dough shaping surface of the dough-engaging portion to contact the first surface of the dough sheet and thereby drawing the first surface toward the second surface and substantially pinching the first and second surfaces together.

3. The method of claim 2, wherein the dough-engaging portion of the movable cutter is blunt.

4. The method of claim 1, further comprising the step of baking the dough piece to form a baked bread article.

5. The method of claim 4, wherein the total number of voids in the baked bread article is reduced by about 20% or greater as compared to a total number of voids in a baked bread article prepared from a dough composition formulated without the void-reducing amount of light colored fiber or bran.

6. The method of claim 1, wherein the flour component consists essentially of white or refined flour.

7. The method of claim 1, wherein the fiber or bran is oat fiber.

8. The method of claim 7, wherein the oat fiber is present in the dough composition in an amount ranging from about 1% to about 5% by weight.

9. The method of claim 1, wherein the fiber or bran is durum bran.

10. The method of claim 9, wherein the durum bran is present in the dough composition in an amount ranging from about 0.5% to about 6% by weight.

11. The method of claim 9, wherein the durum bran is provided in the form of whole grain durum flour.

12. The method of claim 11, wherein the whole grain durum flour is present in the dough composition in an amount ranging from about 1% to about 15% by weight.

13. The method of claim 1, wherein the dough composition comprises:
about 35% to about 75% weight white or refined flour;
about 15% to about 50% weight water;
about 0.25% to about 10% weight yeast; and
about 1% to about 5% weight of oat fiber.

14. The method of claim 1, wherein the dough composition comprises:
about 35% to about 75% weight white or refined flour;
about 15% to about 50% weight water;
about 0.25% to about 10% weight yeast; and
about 0.5% to about 6% weight durum bran.

15. The method of claim 1 wherein the baked white bread article is a dinner roll.

16. The method of claim 1 wherein the dough-engaging portion of the dough cutting apparatus is round or blunt.

17. A method of making a baked white bread article comprising the steps of:
(a) providing a sheet of a developed white bread dough composition having a first surface and a second surface, the developed dough composition comprising:
(i) a flour component comprising white or refined flour,
(ii) a liquid component,
(iii) a leavening agent, and
(iv) a void-reducing amount of a light-colored fiber or bran, the fiber or bran being oat fiber, oat bran, durum bran, whole grain durum flour, or a mixture thereof, wherein the fiber or bran is present in the dough composition in an amount ranging from about 0.5% to about 6% by weight;
(b) providing a dough cutting apparatus having a movable cutter with a dough-engaging portion that extends sufficiently to sever the dough sheet,
(c) severing the dough sheet with the dough-engaging portion to form a dough piece;
(d) causing the moveable cutter to release the dough piece;
(e) freezing the dough piece;
(f) thawing and proofing the dough piece in a retarder, wherein the leavening agent in the dough piece comprises yeast in an amount to proof the dough piece in the retarder, and wherein the yeast is present in an amount from 0.25% to 10% by weight on a dry basis; and
(g) baking the dough piece after having been frozen to form a baked bread article with a total number of voids that is about 20% or more less than a total number of voids in a comparable baked bread article prepared from a dough composition formulated without the void-reducing amount of light colored fiber or bran.

18. The method of claim 17 wherein the baked white bread article is from about 1 to 3 ounces.

19. A method of making a dough piece that can be baked to provide a baked white bread article having no voids greater than 1 inch, the method comprising the steps of:
(a) providing a sheet of a developed white bread dough composition having a first surface and a second surface, the developed dough composition comprising:
(i) a flour component comprising white or refined flour,
(ii) a liquid component,
(iii) a leavening agent, and
(iv) a void-reducing amount of a light-colored fiber or bran, the fiber or bran being oat fiber, oat bran, durum bran, whole grain durum flour, or a mixture thereof, wherein the fiber or bran is present in the dough composition in an amount ranging from about 0.5% to about 6% by weight;
(b) providing a dough cutting apparatus having a movable cutter with a dough-engaging portion that extends sufficiently to sever the dough sheet,
(c) severing the dough sheet with the dough-engaging portion to form a dough piece;
(d) causing the moveable cutter to release the dough piece;
(e) freezing the dough piece; and
(f) thawing and proofing the dough piece in a retarder, wherein the leavening agent in the dough piece comprises yeast in an amount to proof the dough piece in the retarder, and wherein the yeast is present in an amount from 0.25% to 10% by weight on a dry basis.

* * * * *